No. 757,135. PATENTED APR. 12, 1904.
F. MELAUN.
MANUFACTURE OF DISK WHEELS OF METAL.
APPLICATION FILED JULY 9, 1903.
NO MODEL.
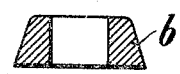
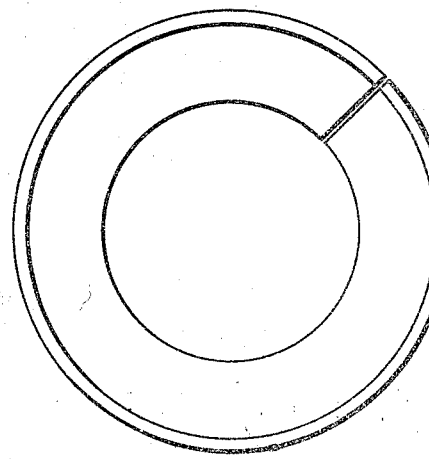
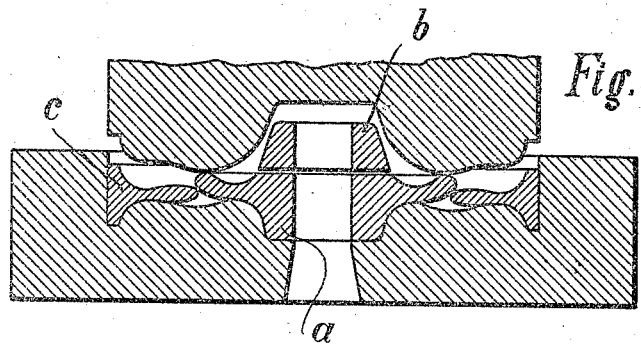
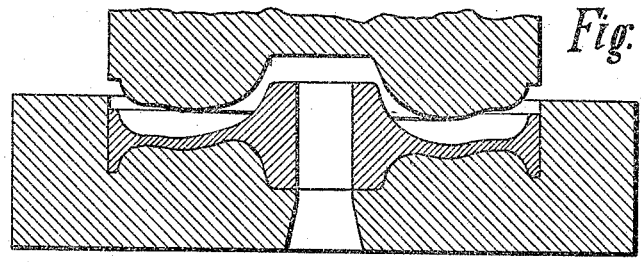

No. 757,135. Patented April 12, 1904.

UNITED STATES PATENT OFFICE.

FRANZ MELAUN, OF CHARLOTTENBURG, GERMANY, ASSIGNOR TO FRIED. KRUPP, OF ESSEN-ON-THE-RUHR, GERMANY.

MANUFACTURE OF DISK WHEELS OF METAL.

SPECIFICATION forming part of Letters Patent No. 757,135, dated April 12, 1904.

Application filed July 9, 1903. Serial No. 164,802. (No model.)

*To all whom it may concern:*

Be it known that I, FRANZ MELAUN, a subject of the Emperor of Germany, and a resident of Charlottenburg, Germany, have invented certain new and useful Improvements in the Manufacture of Disk Wheels of Metal, of which the following is a specification.

According to the methods of manufacture now usual metal disk wheels, such as wrought-iron disk wheels for railway-carriages, are made by first forging each wheel from a block under a steam-hammer in a die and then finishing it off by rolling it in a disk-rolling mill or (according to Krupp's folding process) by first forming a hub for the wheel with a flat central flange from a block, wrapping first a small and then a broad flat portion around the periphery of this flange, and welding the wheel so wrapped in a die under the steam-hammer.

The present invention will now be described with reference to the example of construction illustrated in the accompanying drawings, where the manufacture of a disk wheel is illustrated composed of three rings welded together.

Figure 1 shows in vertical section an angular ring $a$, which can be easily produced under a press or steam-hammer in a die and which when the wheel is to be composed of three rings forms a portion of the hub. Fig. 2 shows in vertical section a conical ring $b$, which likewise can be formed by pressing in a die and which is intended along with the ring of Fig. 1 to form the complete hub. Fig. 3 shows a ring $c$ bent up from a rolled piece of iron T-shaped in cross-section. This ring already has the finished felly on its outer periphery. These three rings are welded together in a die, as shown in Fig. 4. The radial seam of the ring $c$ shown at Fig. 3 is also welded simultaneously. In some cases the meeting ends of the ring $c$ may be previously and separately welded on a stamping-press, or the ring may be produced without welding in ordinary breast-rolls. Fig. 5 shows in vertical section the finished disk wheel in the die.

Instead of the two rings $a$ and $b$ the hub may be made from a single piece having a broad middle flange which is to be welded to the ring $c$.

The advantage of the manufacture described lies in the fact that a single press or steam-hammer is sufficient for the manufacture, the disk-rolling mill, which necessitates heavy expenses to maintain and run, being thereby dispensed with.

The invention possesses the advantage over the folding process in that in place of a number of concentric welded seams there is only one such welded seam in each wheel, so that the wheel consequently possesses greater durability in working and is also cheaper to make.

What I claim as new is—

1. The method of making car-wheels which consists in forming an approximately T-shaped bar into a ring, securing the ends of the bar together, and welding to the inner periphery of the ring thus formed, an inner ring having a deflected outer periphery of a circumference greater than the circumference of the inner periphery of the outer or first-formed ring.

2. The method of making car-wheels which consists in welding together the inner periphery of an outer ring, T-shaped in cross-section and having its inner periphery extending inwardly to a point approximately midway between the rim and the hub of the wheel to be formed, and an outer periphery of a flange on an inner hub-ring, said flange having its outer periphery deflected and of a greater circumference than the circumference of the inner periphery of the outer ring.

3. The method of making car-wheels which consists in forming an approximately T-shaped bar into a ring, then welding the ends of the bar together, and welding the inner periphery of the ring thus formed with an inner ring.

4. The method of making car-wheels which consists in forming an approximately T-shaped bar into a ring then welding together simultaneously the ends of the bar, the inner periphery of the ring thus formed with the outer periphery of a flange on an inner hub-ring, and a face on the inner hub-ring with the face on another hub-ring.

The foregoing specification signed at Berlin, Germany, this 23d day of June, 1903.

FRANZ MELAUN.

In presence of—
 WOLDEMAR HAUPT.
 HENRY HASPER.